US008131872B2

(12) United States Patent (10) Patent No.: US 8,131,872 B2
Kennedy et al. (45) Date of Patent: Mar. 6, 2012

(54) AFFINITY-BASED TRANSACTION PROCESSING

(75) Inventors: Michael Bruce Kennedy, San Jose, CA (US); Robert Mark Magid, Monroe Township, NJ (US); Mark Neal Ziebarth, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 681 days.

(21) Appl. No.: 12/130,746

(22) Filed: May 30, 2008

(65) Prior Publication Data

US 2009/0296711 A1 Dec. 3, 2009

(51) Int. Cl.
*G06F 15/173* (2006.01)
(52) U.S. Cl. .................................................. 709/241
(58) Field of Classification Search .................. 709/235, 709/217, 203, 223, 219, 228, 226, 227, 224, 709/204; 705/9, 8, 7, 6, 50, 39, 38, 37, 34, 705/28, 26; 370/401, 522, 463, 338, 248, 370/230, 467, 466, 465, 397, 395.51, 356, 370/352, 351
See application file for complete search history.

(56) References Cited

U.S. PATENT DOCUMENTS

| | | | |
|---|---|---|---|
| 5,341,477 A * | 8/1994 | Pitkin et al. .................. 709/226 |
| 6,230,183 B1 * | 5/2001 | Yocom et al. ................. 718/105 |
| 6,571,270 B1 | 5/2003 | Lai et al. |
| 6,999,997 B2 | 2/2006 | Clarke et al. |
| 7,454,422 B2 | 11/2008 | Chan et al. |
| 7,499,908 B2 | 3/2009 | Elnaffar et al. |
| 7,650,416 B2 | 1/2010 | Wu et al. |
| 7,693,847 B1 | 4/2010 | Brown et al. |
| 2001/0052024 A1 * | 12/2001 | Devarakonda et al. ....... 709/238 |
| 2002/0161839 A1 * | 10/2002 | Colasurdo et al. ............ 709/204 |
| 2005/0041674 A1 * | 2/2005 | Rooney ......................... 370/401 |
| 2006/0168080 A1 | 7/2006 | Surlaker et al. |
| 2006/0195816 A1 | 8/2006 | Grandcolas et al. |
| 2008/0091779 A1 | 4/2008 | Chetuparambil et al. |
| 2009/0034537 A1 | 2/2009 | Colrain et al. |

* cited by examiner

*Primary Examiner* — Asad M Nawaz
*Assistant Examiner* — Charles Murphy
(74) *Attorney, Agent, or Firm* — Toler Law Group

(57) ABSTRACT

A transaction message is received at a router. A determination is made whether the transaction message includes an affinity. The affinity indicates an administrator-specified preference regarding processing of the transaction message. When the transaction message includes the affinity, a server system to process the transaction message is identified based on the affinity and based on a system affinity of the server system. The system affinity specifies processing characteristics of the server system. The server system includes a set of servers. The transaction message is modified to identify the server system and routed to a message queue.

25 Claims, 8 Drawing Sheets

602
  OPTIONS(STRUCTURE(COM_DEF_1),STATUS(ENABLED),
604 NETREJECT(ERR_MSG_1),PGMREJECT(CODE(ERR_1)))

606 SYSTEM(TARG(IMSGRP01),IMS(IMS1,IMS2,IMS3),STATUS(ENABLED))

608 SYSTEM(TARG(IMSGRP02),IMS(IMSA),STATUS(DISABLED))

610 SYSTEM(TARG(IMSGRP03),IMS(*),STATUS(ENABLED))

AFFINITY(TYPE(TRANSACT),TARG(IMSGRP03),DISP(REJECT),

612 DEST(NAME(TRANSMSG)),STATUS(ENABLED))

AFFINITY(TYPE(TRANSACT),TARG(IMSGRP01,IMSGRP02),DISP(QUEUE),

614 DEST(NAME(I&S*)),STATUS(ENABLED))

AFFINITY(TYPE(TRANSACT),TARG(IMSGRP02),DEST(CLASS(1,2,3)))

FIG. 6

AFFINITY-BASED TRANSACTION PROCESSING

I. FIELD

The present disclosure is generally related to affinity-based transaction processing.

II. BACKGROUND

Generally, in a multiple server environment, when a transaction message is received at a common message queue, each server in the multiple server environment is notified that the transaction message has arrived. Each server may then determine if it has the resources to process the transaction message and, when the server has sufficient resources to process the transaction message, the server may send a bid to process the transaction message. Upon receipt of multiple bids, the transaction message may be routed to a server that is selected at random in order to distribute transaction message processing equally among the multiple servers of the multiple server environment.

III. BRIEF SUMMARY

A system and method to route a transaction record is disclosed. In a particular embodiment, the method includes receiving a transaction message at a router. A determination is made whether the transaction message includes an affinity. The affinity indicates an administrator-specified preference regarding processing of the transaction message. When the transaction message includes the affinity, a server system is selected to process the transaction message. The server system includes one or more servers. The server system is selected from among a plurality of server system based on the transaction message affinity and based on a system affinity of the server system. The system affinity specifies processing characteristics of the server system. Based on the transaction message affinity and based on the system affinity, the transaction message is modified to include an identification of the server system. The modified transaction message is routed to a message queue for subsequent processing by the identified server system.

IV. BRIEF DESCRIPTION OF THE DRAWINGS

FIG. 6 is an illustrative embodiment of customer definitions;

V. DETAILED DESCRIPTION

Figure 1:
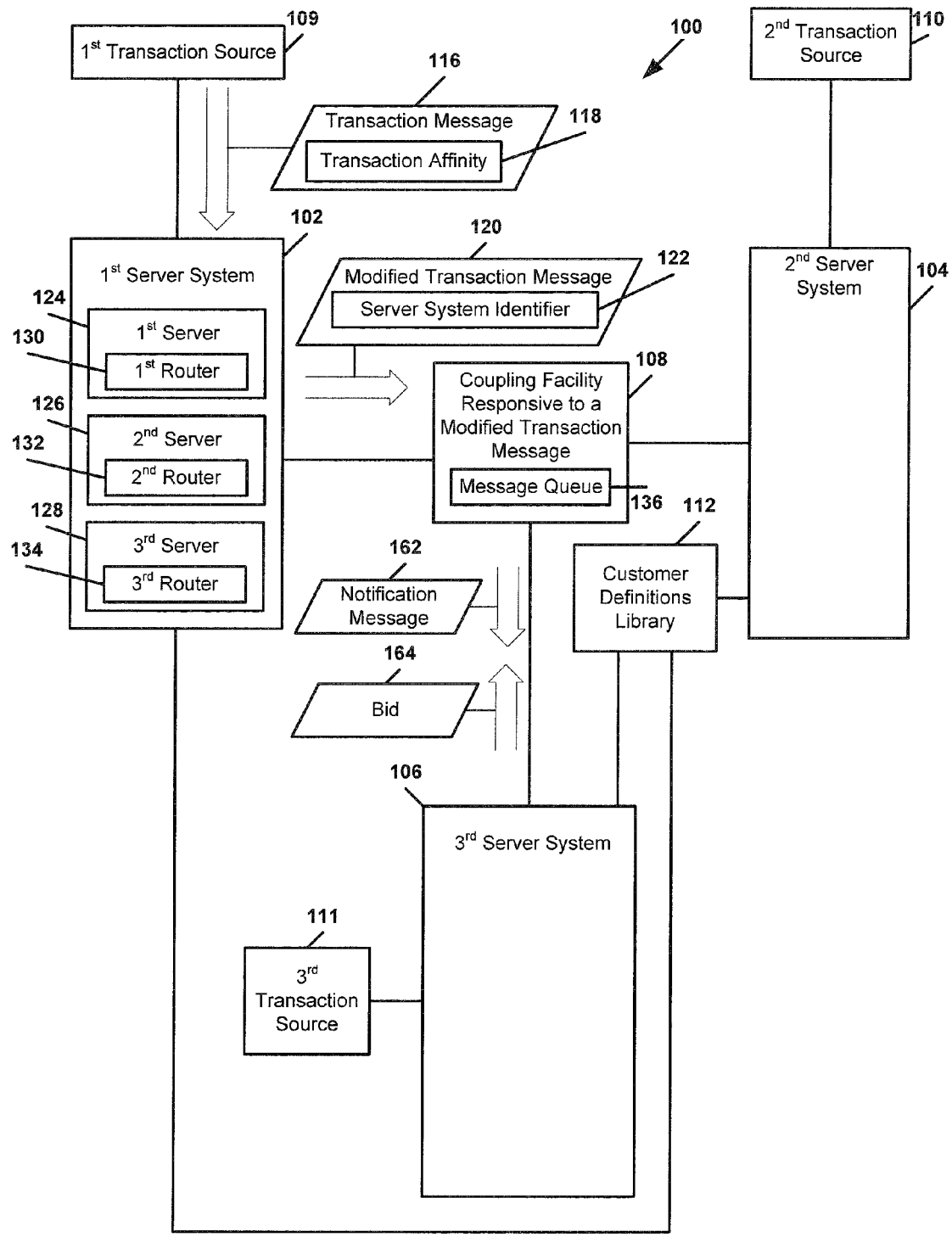
FIG. 1 is a block diagram of a first embodiment of a system to route a transaction message.

FIG. 1 is a block diagram of a first particular embodiment of a system 100 to route a transaction message. The system 100 includes a first server system 102, a second server system 104, and a third server system 106 coupled to a coupling facility 108. A first transaction source 109 is coupled to the first server system 102. A second transaction source 110 is coupled to the second server system 104. A third transaction source 111 is coupled to the third server system 106. The server systems 102, 104, and 106 are coupled to a customer definitions library 112.

Each of the server systems 102, 104, and 106 may be adapted to receive a transaction message from a transaction source, to modify the transaction message, and to send the transaction message to the coupling facility 108. For example, the first server system 102 is adapted to receive a transaction message 116 including a transaction affinity 118 from the first transaction source 109. The first server system 102 is also adapted to modify the transaction message 116 to create a modified transaction message 120 including a server system identifier 122 and to send the modified transaction message 120 to the coupling facility 108. In the illustrated embodiment, the first server system 102 includes a first server 124, a second server 126, and a third server 128. In other embodiments, the first server system 102 may include more or fewer servers. The first server 124 includes a first router 130, the second server 126 includes a second router 132, and the third server 128 includes a third router 134. In addition, each of the server systems 104 and 106 also include one or more servers (not shown). In an illustrative embodiment, one or more of the servers 124, 126, and 128 may be configured as a transaction and hierarchical database management system or as an information management system (IMS).

The coupling facility 108 may be adapted to receive a modified transaction message, such as the modified transaction message 120, at a message queue 136. The coupling facility 108, responsive to receiving the modified transaction message 120, may be further adapted to identify a target server system based on the server system identifier 122 and to send a notification message 162 to the target server system. In FIG. 1, the target server system is one of the server systems 102, 104, or 106.

In operation, a router, such as the first router 130, receives the transaction message 116 and determines whether the transaction message 116 includes the transaction affinity 118. When the transaction message 116 includes the transaction affinity 118, the first router 130 selects a server system from the server systems 102, 104, and 106, and modifies the transaction message 116 to create the modified transaction message 120 that includes the selected server system identification 122. The first router 130 then sends the modified transaction message 120 to the message queue 136 of the coupling facility 108.

The coupling facility 108, responsive to receiving the modified transaction message 120 at the message queue 136, selects a target server system from the server systems 102, 104, and 106 based on the server system identifier 122, and sends the notification message 162 to the selected server system. For example, the notification message 162 may be sent to the third server system 106. In response, at least one server in the server system 106 may send a bid 164 to the coupling facility 108. The bid 164 identifies a server (not shown) of the third server system 106 that has sufficient resources to process the modified transaction message 120. The coupling facility 108 selects a server of the third server system 106 based on the received bids, such as the bid 164, and sends the modified transaction message 120 to the selected server for processing.

Figure 2:
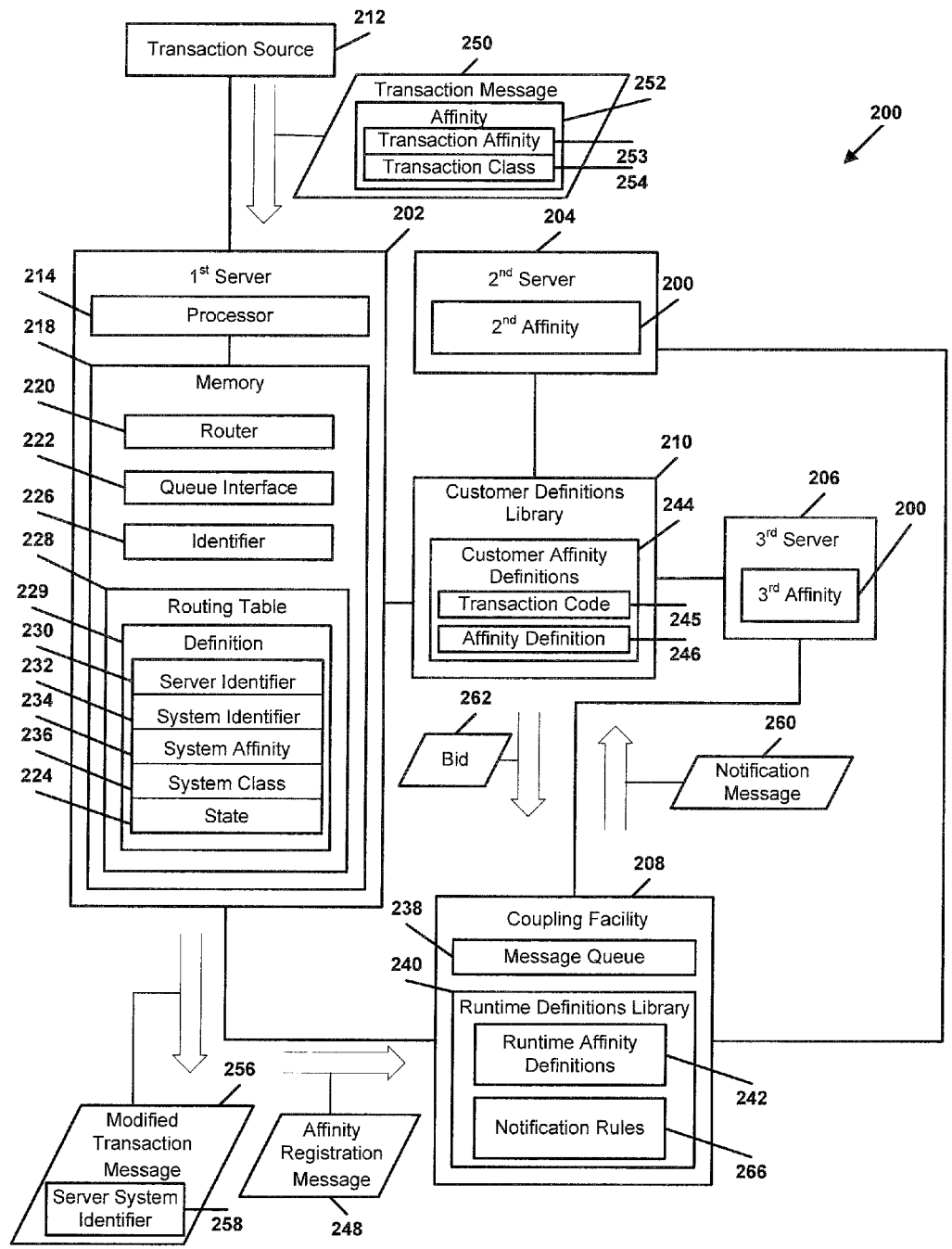
FIG. 2 is a block diagram of a second embodiment of a system to route a transaction message.

FIG. 2 is a block diagram of a second particular embodiment of a system 200 to route a transaction message. The system 200 is an example of a server system and includes a first server 202, a second server 204, and a third server 206 that are each coupled to a coupling facility 208 and to a customer definitions library 210. One or more of the servers 202, 204, and 206 may be configured as a transaction and hierarchical database management system or an information management system (IMS). A transaction source 212 is coupled to the first server 202.

The servers 202, 204, and 206 may be adapted to receive and to process transaction messages. The first server 202 includes a processor 214 coupled to a memory 218. The memory 218 includes a router 220, a queue interface 222, an identifier 226, and a routing table 228. The router 220 may be adapted to route transaction messages to a message queue. The queue interface 222 may be adapted to provide the first server 202 an interface for accessing a message queue at a coupling facility. The identifier 226 identifies the first server 202. The routing table 228 includes a representative definition 229 which defines characteristics associated with a server, such as the system to which the server belongs, and the system affinity and system class associated with the system. The representative definition 229 in the routing table 228 may associate a server identifier 230 to a system identifier 232, a system affinity 234, a class affinity 236, and a state 224. The server identifier 230 uniquely identifies a server, such as the second server 204. The system identifier 232 may indicate the system associated with the server identified by the server identifier 230. The system affinity 234 may indicate an affinity associated with the system identified by the system identifier 232. The class affinity may indicate a class of transactions capable of being processed by the system identified by the system identifier 232. The state 224 may indicate a state, such as an active state or an inactive state, associated with the server identified by the server identifier 230.

The router 220 may use the routing table 228 to select a server to process a transaction message. To perform the various functions of the first server 202, the processor 214 is adapted to execute computer readable instructions of the router 220 and of the queue interface 222. The processor 214 may also read, modify, and write data stored at the routing table 228 and at the identifier 226.

The coupling facility 208 includes a message queue 238 and a runtime definitions library 240. The run time definitions library 240 includes runtime affinity definitions 242 and notification rules 266. The coupling facility 208 may be adapted to receive transaction messages at the message queue 238 from the transaction source 212 via the router 220.

The customer definitions library 210 includes customer affinity definitions 244. The customer affinity definitions 244 include one or more affinity definitions, such as a representative affinity definition 246. The customer affinity definitions 244 also include one or more transaction codes, such as a representative transaction code 245. The representative transaction code 245 is compared to the representative affinity definition 246 to determine whether the transaction code 245 is associated with a specific affinity, a generic affinity, or a class affinity. A customer may use the customer affinity definitions 244 to associate one or more transaction affinities with a particular server or server system. For example, a customer may use the customer affinity definitions 244 to associate an affinity "IMS" with the second server 204. Subsequently, when the customer creates a transaction message having the transaction affinity "IMS," the transaction message may be routed to the second server 204 for processing.

The coupling facility 208 may use notification rules 266 to determine which of servers should be notified that a transaction message has arrived for processing. For example, the notification rules 266 may include information identifying which of the servers 202, 204, and 206 are in an active state to enable the coupling facility 208 to notify only active servers about the arrival of a transaction message.

Router Initialization

The router 220 may be implemented as a process executing computer executable instructions stored at a computer readable medium. The first server 202 may install the computer executable instructions of the router 220 at a computer readable medium, such as the memory 218. After installing the router 220, the first server 202 may initialize the router 220 at different times based on various circumstances. For example, the first server 202 may initialize the router 220 during or after the initialization of the first server 202. In the illustrated embodiment, the first server 202 initializes the router 220 before the first server 202 receives a transaction message 250.

During initialization, the router 220 may retrieve the customer affinity definitions 244 from the customer definitions library 210 and determines whether the runtime definitions library 240 includes the customer affinity definitions 244. For example, the router 220 may compare the customer affinity definitions 244 to the runtime affinity definitions 242 and, when the customer affinity definitions 244 are equivalent to the runtime affinity definitions 242, determine that the runtime definitions library 240 includes the customer affinity definitions 244. When the runtime definitions library 240 does not include the customer affinity definitions 244, the router 220 may create the runtime affinity definitions 242 based on the customer affinity definitions 244. For example, to create the runtime affinity definitions 242, the router 220 may parse one or more of the customer affinity definitions 244 and convert the customer affinity definitions 244 from a customer format to a coupling facility format.

The routing table 228 may include an entry for each server in one or more server systems. Each routing table entry may include a server identifier for each server of a server system and information, such as a system identifier, a system affinity, a class affinity, and a state associated with each server identifier, such as the representative routing table 228. In the representative routing table 228, the representative server identifier 230 is associated with the representative system identifier 232, the representative system affinity 234, the representative class affinity 236, and the state 224. The server identifier 230 may include one or more alphanumeric characters.

During initialization, the router 220 may create the routing table 228 based on the customer affinity definitions 244. The router 220 may also determine whether the affinity definition 246 includes the identifier 226 of the first server 202 that is associated with the router 220. When the affinity definition 246 includes the identifier 226, the affinity definition 246 indicates that the first server 202 is a preferred server for processing a transaction message having a particular transaction affinity or a particular class affinity specified by the affinity definition 246. For example, when the affinity definition 246 indicates that the identifier 226 has a "TRANS" affinity, then a transaction message with the affinity "TRANS" may indicate that a system administrator has requested that the transaction message be processed by a server having a "TRANS" affinity, such as the first server 202. Thus, the system administrator can specify that the transaction message should be processed by a particular server system based on the affinity of the transaction message. For example, the system administrator may specify that a particular server system processes the transaction message because only that particular server system has the resources to process the transaction.

When the affinity definition 246 includes the identifier 226, the router 220 may send an affinity registration message 248 to the coupling facility 208. The affinity registration message 248 identifies that the first server 202 is associated with a system affinity based on the affinity definition 246. The coupling facility 208 stores the information of the affinity registration message 248 at the runtime definitions library 240 for use during runtime operation.

Runtime Operation

During runtime operation, after the first server 202 has initialized the router 220, the first server 202 may receive a transaction message 250 from the transaction source 212. The first server 202 may then request the router 220 to process the transaction message 250. For example, in one embodiment, the first server 202 passes control to the router 220 to process the transaction message 250 and, when the router 220 has completed processing the transaction message 250, the router 220 returns control back to the first server 202. The router 220 may receive the transaction message 250 and determine whether the transaction message 250 includes an affinity 252 indicating an administrator-specified preference regarding processing of the transaction message 250. The affinity 252 may include a transaction affinity 253 and a class affinity 254.

When the transaction message 250 includes the affinity 252, the router 220 may select a server system among a plurality of server systems to process the transaction message 250 based on the affinity 252 and based on the system affinity 234 of the server system. For example, in FIG. 1, a plurality of server systems includes the server systems 102, 104, and 106. The system affinity 234 specifies processing characteristics of each server system, such as the server system 200.

The router 220 may select a server system by using the routing table 228 to determine whether the transaction message 250 has a specific affinity, a generic affinity, or a class affinity to a particular server system. The router 220 may determine whether the transaction message 250 has a specific affinity to the particular server system by determining whether the transaction affinity 253 matches the system affinity 234 associated with the particular server system. For example, when the transaction affinity 253 indicates a system identifier, the router 220 determines whether the transaction affinity 253 matches the system identifier 232.

The router 220 may determine whether the transaction message 250 has a generic affinity to the particular server system by determining whether the transaction affinity 253 matches a portion of the system affinity 234 associated with the particular server system. For example, when the transaction affinity 253 indicates a system identifier, the router 220 determines whether the transaction affinity 253 matches a portion of the system identifier 232. To illustrate, the router 220 may use one or more wild card characters to determine the system identifier 232 that is the closest match to the transaction affinity 253. When more than one system identifier matches the transaction affinity, the router 220 may use a matching algorithm to determine which system identifier 232 is a closest match to the transaction affinity 253.

The router 220 may determine whether the transaction message 250 has a class affinity to the particular server system by determining whether the transaction class 254 of the transaction message 250 matches the class affinity 236 associated with the system identifier 232. When the class affinity 236 of more than one server system matches the transaction class 254, the router 220 may select a server system based on a selection algorithm or may randomly select a server system from the matching server systems. For example, a system administrator may define a transaction class "1" to indicate a high priority transaction message, a transaction class "2" to indicate a medium priority transaction message, and a transaction class "3" to indicate a low priority transaction message. When the transaction class 254 has a class of "1," the transaction message 250 is routed to a server system having a class affinity of "1."

The router 220 may also identify a set of target servers of the particular server system and determine whether the set of target servers includes at least one active server. For example, the router 220 may select the server system 200 including the servers 202, 204, and 206 and may use the state 224 to determine whether at least one of the servers 202, 204, or 206 are active. The router 220 may select the particular server system when the set of target servers includes at least one active server.

The router 220 may modify the transaction message 250 to create a modified transaction message 256 that includes a server system identifier 258 and may route the modified transaction message 256 to the message queue 238 at the coupling facility 208. The server system identifier 258 indicates the server system selected by the router 220 to process the modified transaction message 256.

The router 220 may use the queue interface 222 to route the modified transaction message 256 to the coupling facility 208. For example, the queue interface 222 may be implemented as a common queue server (CQS). The coupling facility 208 may receive the modified transaction message 256 and determine whether the modified transaction message 256 includes the server system identifier 258 indicating a preference regarding processing of the modified transaction message 256.

The coupling facility 208 may select a server system to process the modified transaction message 256 based on the notification rules 266 and based on whether the modified transaction message 256 includes the server system identifier 258. The coupling facility 208 may send a notification message 260 to each server of the selected server system. The notification message 260 may request each server of the selected server system to send a bid to process the modified transaction message 256.

The coupling facility 208 may receive at least one bid 262 from the selected server system to process the modified transaction message 256. The coupling facility 208 may select a server of the selected server system to process the modified transaction message 256 based on the at least one bid 262. For example, the coupling facility 208 may select the server system based on a variety of criteria, including when the coupling facility 208 receives the at least one bid 262, the amount of resources available at each server system, at random, other characteristic of the server system, or any combination thereof. After selecting the server system, the coupling facility 208 may send the modified transaction message 256 to the server system to enable the server system to process the modified transaction message 256.

Thus, the affinity 252 of the transaction message 250 may be used by a system administrator to specify one or more server systems to process the transaction message 250. For example, the system administrator may define various affinity definitions and configure the system to process transaction messages based on the affinity of the transaction message in order to substantially maximize the use of resources with a limited availability and reduce contention from servers that are trying to access certain resources.

In addition, the system administrator may define various affinity definitions and configure the system in order to try and reduce global false-scheduling. Global false-scheduling occurs when more than one server system attempts to take ownership of the modified transaction message 256 that has been placed on the message queue 238. Since only a single server system may take ownership of the modified transaction message 256 to process the modified transaction message 256, the other server systems may expend resources in an attempt to take ownership. Using an affinity-based routing system, global false-scheduling may be reduced or eliminated because fewer server systems bid to process the modified transaction message 256. In an affinity-based routing system, the system administrator can use affinity definitions to configure the system to enable only the server system that has the system affinity 234 that matches the transaction affinity 253 is requested to bid to process the modified transaction message 256. When a transaction message has a generic affinity, only those server systems that have the system affinity 234 that matches a portion of the transaction affinity 253 are selected to bid. When a transaction message has a class affinity, only those server systems that have the class affinity 236 that matches the transaction class 254 are selected to bid.

Figure 3:
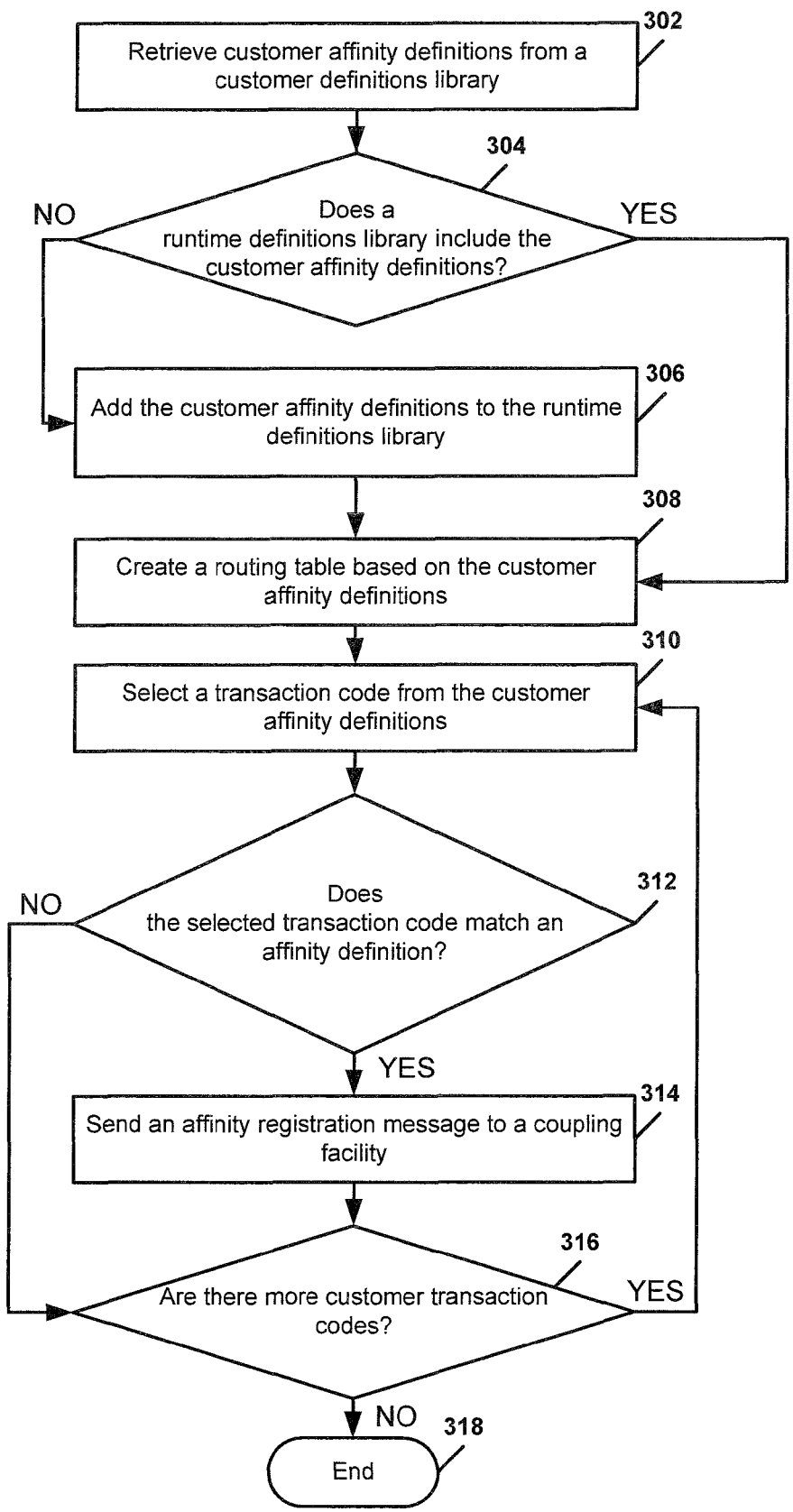
FIG. 3 is a flow diagram of an illustrative embodiment of a method to initialize a router.

FIG. 3 is a flow diagram of an illustrative embodiment of a method to initialize a router. The method of FIG. 3 may be executed by a server, such as the first server 202 in FIG. 2. For example, when the first server 202 initializes, the first server 202 may initialize the router 220 in accordance with the method of FIG. 3.

At 302, customer affinity definitions may be retrieved from a customer definitions library, such as the customer definitions library 210 in FIG. 2. Continuing to 304, a determination may be made whether a runtime definitions library includes the customer affinity definitions. For example, the router 220 in FIG. 2 may compare the customer affinity definitions 244 to the runtime affinity definitions 242 to determine whether the runtime definitions library 240 includes the customer affinity definitions 244. At 304, when the runtime definitions library does not include the customer affinity definitions, then the customer affinity definitions are added to the runtime definitions library at 306, and the method proceeds to 308.

At 304, when the runtime definitions library includes the customer affinity definitions, a routing table may be created based on the customer affinity definitions at 308. A routing table, such as the routing table 228 in FIG. 2, may include information associating at least one system affinity and at least one class affinity to each server in the set of servers. Moving to 310, a transaction code of the customer affinity definitions may be selected. Advancing to 312, a determination may be made whether the selected transaction code matches an affinity definition in the customer affinity definitions. At 312, when the selected transaction code matches the affinity definition, an affinity registration message may be sent to a coupling facility, at 314, and the method may proceed to 316. The affinity registration message may include information based on the selected affinity definition. For example, the affinity registration message may inform the coupling facility that the server associated with the router has an associated system affinity or an associated class affinity.

At 312, when the selected transaction code does not match any of the affinity definitions in the customer affinity definitions, the method proceeds to 316. At 316, a determination may be made whether there are more transaction codes. When a determination is made, at 316, that there are more transaction codes, the method may return to 310. Otherwise, when a determination is made, at 316, that there are no more transaction codes, the method may end at 318.

Figure 4:
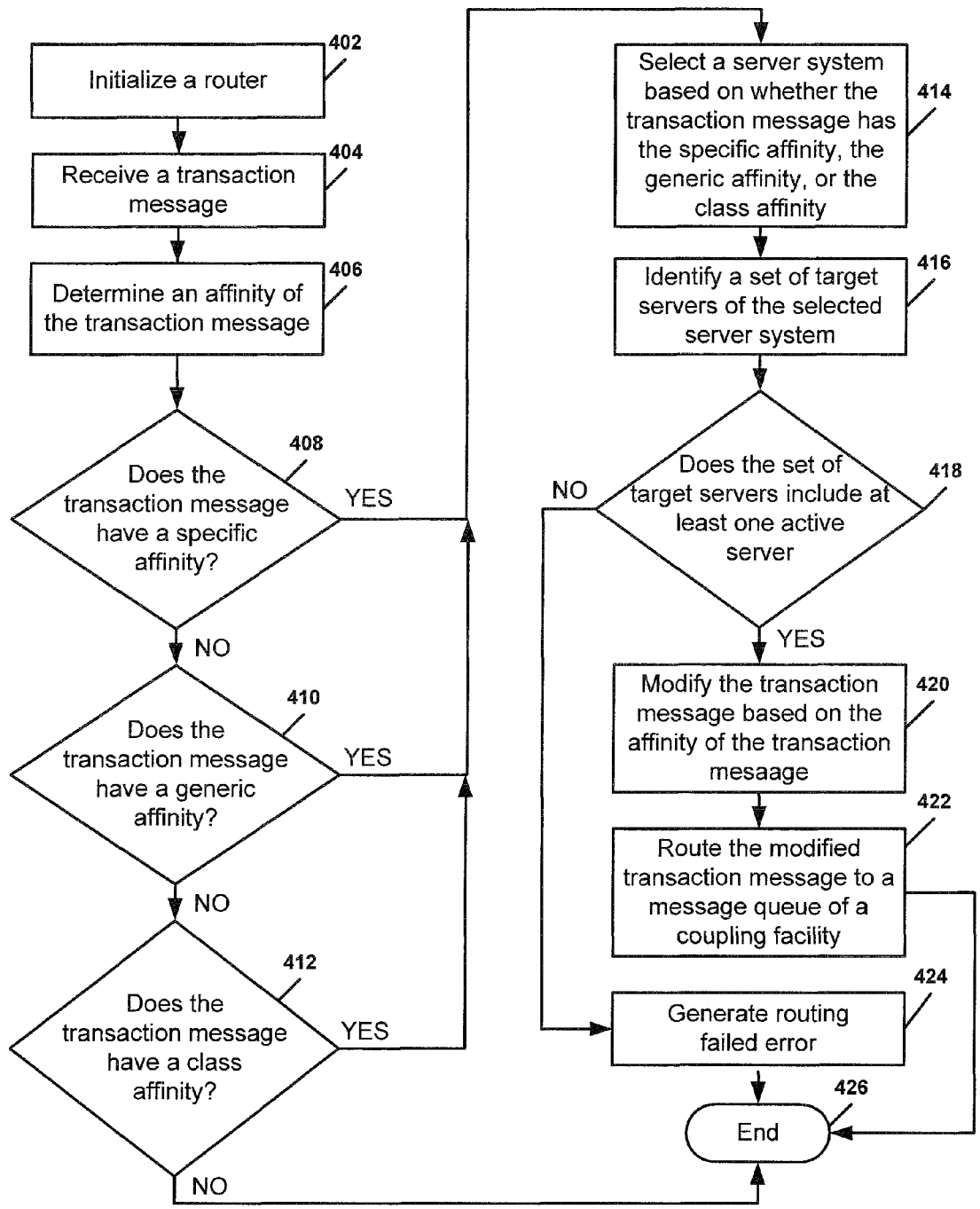
FIG. 4 is a flow diagram of a first illustrative embodiment of a method to route a transaction message.

FIG. 4 is a flow diagram of a first illustrative embodiment of a method to route a transaction message. The method of FIG. 4 may be performed by a component of a server, such as the first server 202 in FIG. 2.

At 402, a router may be initialized. For example, in FIG. 2, the first server 202 may initialize the router 220. Proceeding to 404, a transaction message is received. For example, during runtime operation, the server 202 may receive the transaction message 250. Moving to 406, an affinity of the transaction message is determined. Advancing to 408, a determination may be made whether the transaction message has a specific affinity. For example, when a transaction affinity of the transaction message matches a system affinity of a server system, the transaction message has a specific affinity for the server system. At 408, when the transaction message has a specific affinity, the method may proceed to 414.

When the transaction message is determined to not have a specific affinity, at 408, a determination may be made whether the transaction message has a generic affinity, at 410. For example, when a transaction affinity of the transaction message matches a portion of a system affinity of a server system, the transaction message has a generic affinity for the server system. To illustrate, when the system affinity is in the form of an alphanumeric system identifier, wild card characters may be used to determine whether the transaction affinity of the transaction message matches a portion of the system affinity of the server system. When the transaction message has a generic affinity, at 410, the method may proceed to 414.

When the transaction message is determined to not have a generic affinity, at 410, a determination may be made whether the transaction message has a class affinity, at 412. For example, a determination may be made whether a transaction class of the transaction message matches a class affinity of the server system. At 412, when the transaction message has a class affinity, the method may proceed to 414. When the transaction message is determined to not have a class affinity, at 412, the method may end at 426.

At 414, a server system is selected based on whether the transaction message has the specific affinity, the generic affinity, or the class affinity. Continuing to 416, a set of target servers of the selected server system may be identified. For example, a primary set of target servers may be selected and when the primary set of target servers in not available a secondary or backup set of target servers may be selected. Advancing to 418, a determination may be made whether the set of target servers includes at least one active server. When a determination is made that the set of target servers does not include at least one active server, at 418, a routing failed error may be generated at 424 and the method may end at 426.

When a determination is made that the set of target servers includes at least one active server, at 418, the transaction message is modified based on the affinity of the transaction message at 420. For example, when the affinity of the transaction message is an alphanumeric identifier, the name of the transaction message may be modified to include the alphanumeric identifier. To illustrate, when the affinity of the transaction message is "IMS" and the name of the transaction message is "T1," the name of the transaction message may be modified to "IMS_T1." Proceeding to 422, the modified transaction message is routed to a message queue of a coupling facility, and the method may end at 426.

Figure 5:
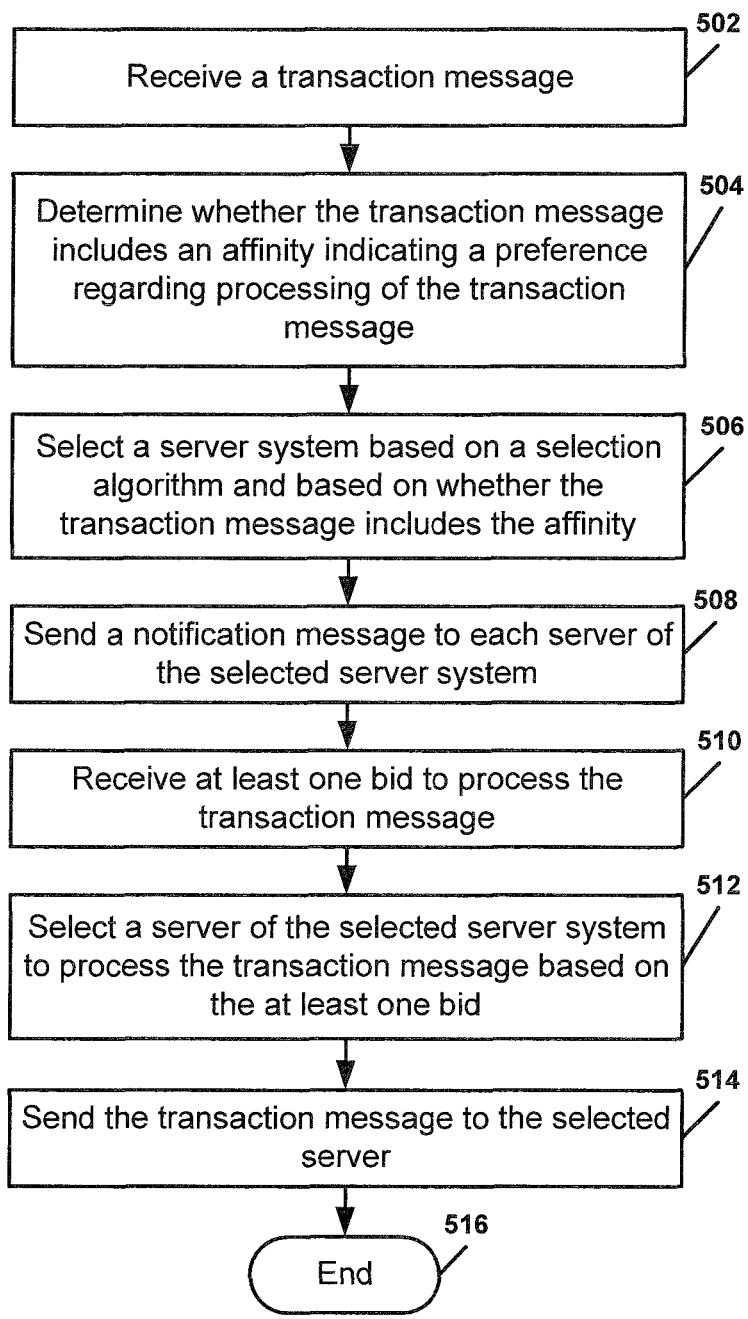
FIG. 5 is a flow diagram of a second illustrative embodiment of a method to route a transaction message.

FIG. 5 is a flow diagram of a second illustrative embodiment of a method to route a transaction message. The method of FIG. 5 may be performed by a network component configured to distribute transaction message to one more servers, such as the coupling facility 208 in FIG. 2.

At 502, a transaction message is received. For example, in FIG. 2, the coupling facility 208 receives the modified transaction message 256. Proceeding to 504, a determination is made whether the transaction message includes an affinity indicating a preference regarding processing of the transaction message. For example, in FIG. 2, the coupling facility 208 determines whether the modified transaction message 256 includes the server system identifier 258. To illustrate, when the name of the modified transaction message 256 is "IMS_T1," the coupling facility determines that the modified transaction message 256 has an affinity for the server system "IMS." Continuing to 506, a server system is selected based on a selection algorithm and based on whether the transaction message includes the affinity. For example, when the name of the modified transaction message 256 is "IMS_T1," the coupling facility selects the server system having the system identifier "IMS." The coupling facility may select the server system based on one or more of the system identifier, the runtime affinity definitions 242, and the notification rules 266.

Advancing to 508, a notification message is sent to each server of the selected server system. The notification message may inform each server that a transaction is available for processing at a message queue of the coupling facility. The notification message may also request each server to send a bid to the coupling facility to process the transaction message. Moving to 510, at least one bid to process the transaction message may be received. Proceeding to 512, a server of the selected server system may be selected to process the transaction message based on the at least one bid. The coupling facility may select a server system to process the transaction message based on various criteria, such as a timestamp of the bid indicating when the bid was sent or received and an indication of the availability of resources at the server system to process the transaction message. Continuing to 514, the transaction message may be sent to the selected server. The method may end at 516.

FIG. 6 is an illustrative embodiment of customer definitions. The customer definitions may be at the customer definitions library 210 in FIG. 2.

Customer definition 602 illustrates how a user can set various configuration options for a router using the customer definitions. The customer definition 602 indicates that the router may use a data structure named COM_DEF_1. The data structure COM_DEF_1 is typically located at a coupling facility. The router may determine whether the COM_DEF_1 data structure is valid before using the COM_DEF_1 data structure. The customer definition 602 also sets the status of the router to "enabled." When an error condition occurs and the transaction message is received from a network entity, such as the transaction source 212 in FIG. 2, the error message ERR_MSG_1 is returned to the network entity. For example, an error condition occurs when no servers are available to process the transaction message. When an error condition occurs and the transaction message is received from another software program, such as another software program in the memory 218, the error message ERR_1 is returned to the program.

Customer definition 604 defines a server system by associating a name IMSGRP01 to a set of servers, IMS1, IMS2, and IMS3, and enabling the status of the server system IMSGRP01. The name IMSGRP01 may be referred to in an affinity definition, such as definitions 610 and 612. Customer definition 606 defines a server system by associating a name IMSGRP02 to a server, IMSA, and disabling the status of the server system IMSGRP02. Customer definition 608 defines a server system by associating the name IMSGRP03 and a wild card character "*," which matches the server associated with the router. For example, during initialization, when the router 220 retrieves customer definition 608 which includes the wild card character "*," then the name IMSGRP03 is associated with the server system 200. The customer definition 608 also enables the status of the server system IMSGRP03.

Customer definition 610 defines an affinity for a transaction message by specifying that a transaction message having the transaction affinity TRANSMSG has an affinity to be processed by the server systems identified by system identifier IMSGRP03. Customer definition 610 also indicates that when an error is encountered, the router should stop processing the transaction message and return a rejection message or rejection code, such as ERR_MSG_1 or ERR_1. When an error is encountered, the user can either specify that the router return a rejection code or rejection message or specify that the router place the transaction message on the message queue without an affinity.

Customer definition 612 defines an affinity for a transaction message by specifying that a transaction message having the generic transaction affinity "I&S*" has an affinity to be processed by the server systems identified by system identifiers "IMSGRP01" or "IMSGRP02." The first system identifier, IMSGRP01 indicates a primary server system for the transaction affinity and the second system identifier, IMSGRP02, specifies a secondary or backup server system. The router will attempt to route the transaction message to the primary server system and, when the primary server system is unavailable, the router may route the transaction message to the secondary server system. In customer definition 612, DISP(QUEUE) indicates that when an error is encountered, the router may queue the transaction message without an affinity.

Customer definition 614 defines an affinity for a transaction message by specifying that a transaction message having a class affinity of 1, 2 or 3 has an affinity to be processed by the server system identified by system identifier "IMSGRP02."

Figure 7:
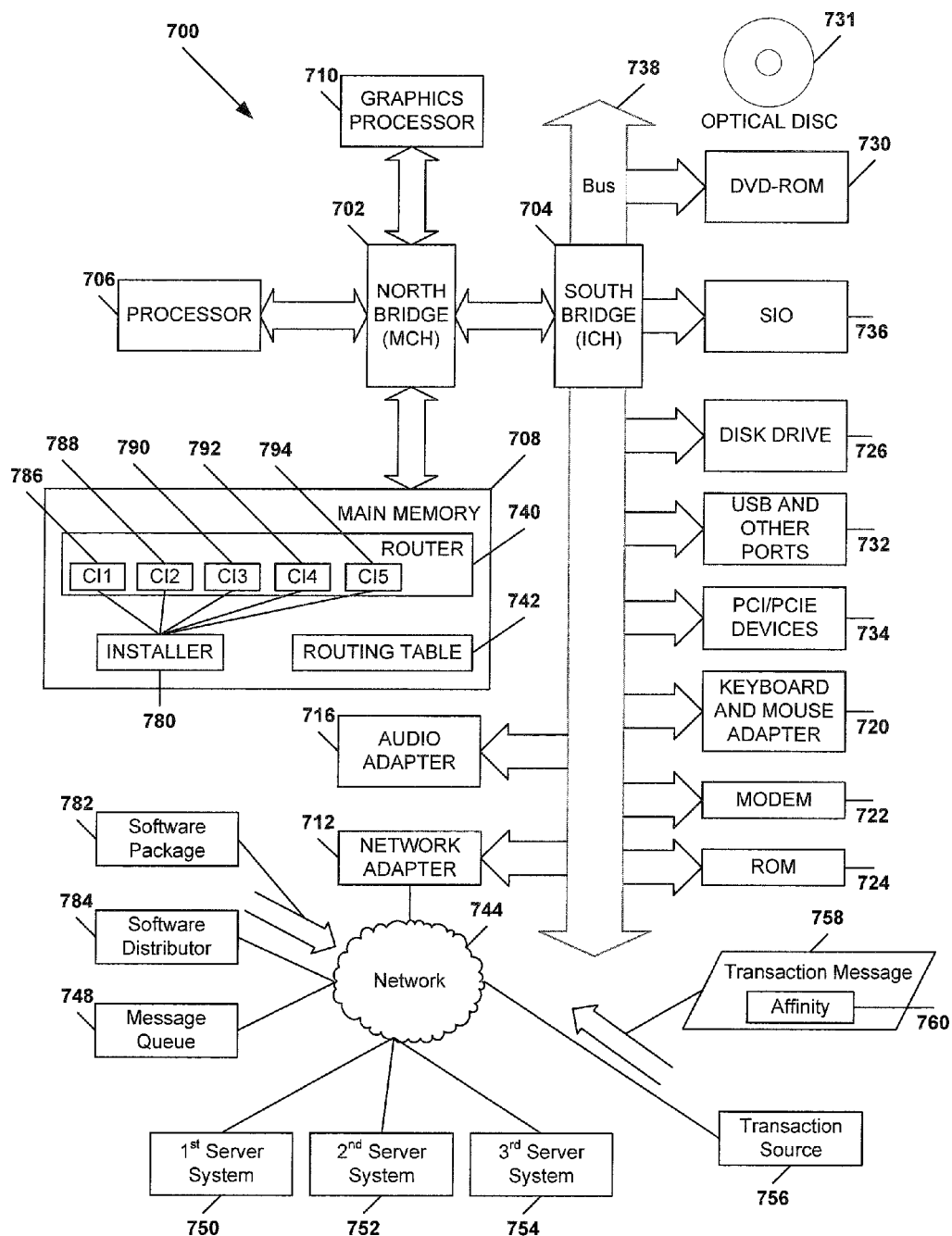
FIG. 7 is a block diagram of a third embodiment of a system to route a transaction message.

FIG. 7 is a block diagram of a computing system in which systems and methods of the present disclosure may be implemented. Computing system 700 includes an example of a server, such as the first server 202 in FIG. 2, in which computer usable code or instructions are executable to implement the various components, such as the router 220 and queue interface 222 may be implemented.

In the depicted example, the computing system 700 employs a hub architecture including a north bridge and memory controller hub (MCH) 702 and a south bridge and input/output (I/O) controller hub (ICH) 704. A processor 706, a main memory 708, and a graphics processor 710 are coupled to the north bridge and memory controller hub 702. For example, the graphics processor 710 may be coupled to the MCH 702 through an accelerated graphics port (AGP) (not shown).

In the depicted example, a network adapter 712 is coupled to the south bridge and I/O controller hub 704 and an audio adapter 716, a keyboard and mouse adapter 720, a modem 722, a read only memory (ROM) 724, universal serial bus (USB) ports and other communications ports 732, and Peripheral Component Interconnect (PCI) and Peripheral Component Interconnect Express (PCIe) devices 734 are coupled to the south bridge and I/O controller hub 704 via bus 738. A disk drive 726 and a DVD-ROM drive 730 are coupled to the south bridge and I/O controller hub 704 through the bus 738. The DVD-ROM drive 730 may be capable of reading various optical media, including compact disc (CD), and digital versatile disc (DVD). The PCI/PCIe devices 734 may include, for example, Ethernet adapters, add-in cards, and PC cards for notebook computers. The ROM 724 may be, for example, a flash binary input/output system (BIOS). The disk drive 726 and the DVD-ROM drive 730 may use, for example, an integrated drive electronics (IDE) or serial advanced technology attachment (SATA) interface. A super I/O (SIO) device 736 may be coupled to the south bridge and I/O controller hub 704.

The main memory 708 includes a router 740 and a routing table 742. The computing system 700 is coupled via a network 744 to a message queue 748, a first server system 750, a second server system 752, a third server system 754, and a transaction source 756. The computing system 700 receives a transaction message 758 having an affinity 760 from the transaction source 756.

The router 740 may be implemented as computer instructions installed onto a computer readable medium, such as the main memory 708. In one illustrative embodiment, the computer instructions of the router 740 may be installed at the main memory 708 via a transfer from another computer readable medium, such as the disk drive 726, from the ROM 724, or from an optical disc 731 capable of being read via the DVD-ROM 730. In another illustrative embodiment, the computer instructions of the router 740 may be installed at the main memory 708 via a transfer from another computer readable medium accessible to the network 744. For example, the computer instructions of the router 740 may emanate from a server (not shown) of the first server system 750. The computer instructions of the router 740 may be received via the network adapter 712 and may be installed at the main memory 708.

The router 740 includes a computer implemented process to enable routing a transaction message based on an affinity of the transaction message. The computer implemented process to enable routing the transaction message based on the affinity of the transaction message is made by a method that includes installing first computer instructions onto a computer readable medium, such as the main memory 708. The first computer instructions are configured to receive a transaction message at the router 740. Second computer instructions are further installed onto the computer readable medium. The second computer instructions are configured to determine whether the transaction message includes an affinity indicating an administrator-specified preference regarding processing of the transaction message. When the transaction message includes the affinity, the second computer instructions are configured to select a server system among a plurality of server systems to process the transaction message based on the affinity and based on a system affinity of the server system. The system affinity specifies processing characteristics of the server system. The server system comprises a set of servers.

Third computer instructions are further installed onto the computer readable medium. The third computer instructions are configured to modify the transaction message to include an identification of the server system. Fourth computer instructions are further installed onto the computer readable medium. The fourth computer instructions are configured to route the modified transaction message to a message queue.

Selecting the server system includes installing fifth computer instructions onto the computer readable medium. The fifth computer instructions are configured to determine whether the transaction message has a specific affinity to the server system by determining whether a transaction affinity of the transaction message matches the system affinity associated with the server system. The fifth computer instructions are further configured to determine whether the transaction message has a generic affinity to the server system by determining whether the transaction affinity of the transaction message matches a portion of the system affinity associated with the server system. The fifth computer instructions are further configured to determine whether the transaction message has a class affinity by determining whether a transaction class of the transaction message matches a class attribute associated with the server system.

The method to make the computer implemented process to enable routing the transaction message 758 based on the affinity 760 of the transaction message 758 may be performed by an installer 780 that is provided by and functions on behalf of, or as an agent of, a software distributor 784. The installer 780 may perform installation functions in response to detecting a system message from the keyboard and mouse adapter 720. In one embodiment, in response to detecting a system message from the keyboard and mouse adapter 720, a software package 782 may be downloaded from the software distributor 784 via the network 744 and then executed to create the installer 780. In another embodiment, in response to detecting a system message from the keyboard and mouse adapter 720, the installer 780 may download the software package 782 from the software distributor 784.

The installer 780 may carry out various installation steps to transform the software package 782 from an un-executable, unusable state to an executable, useful state. For example, the installer 780 may install first computer instructions (CI) 786, second CI 788, third CI 790, fourth CI 792, and fifth CI 794 to create a computer implemented process, such as the router 740, to enable routing the transaction message 758 based on the affinity 760.

An operating system (not shown) runs on the processor 706 and coordinates and provides control of various components within the computing system 700. The operating system may be a commercially available operating system such as Microsoft® Windows® XP (Microsoft and Windows are trademarks of Microsoft Corporation in the United States, other countries, or both). An object oriented programming system, such as the Java® programming system, may run in conjunction with the operating system and provide calls to the operating system from Java programs or applications executing on computing system 700 (Java and all Java-based trademarks are trademarks of Sun Microsystems, Inc. in the United States, other countries, or both).

Instructions for the operating system, the object-oriented programming system, and applications or programs are located on storage devices, such as the hard disk drive 726, and may be loaded into the main memory 708 for execution by the processor 706. The processes of the disclosed illustrative embodiments may be performed by the processor 706 using computer implemented instructions, which may be located in a memory such as, for example, the main memory 708, the read only memory 724, or in one or more of the peripheral devices.

The hardware in computing system 700 may vary depending on the implementation. Other internal hardware or peripheral devices, such as flash memory, equivalent non-volatile memory, or optical disk drives and the like, may be used in addition to or in place of the hardware depicted in FIG. 7. Also, the processes of the disclosed illustrative embodiments may be applied to a multiprocessor data processing system.

In some illustrative examples, portions of the computing system 700 may be implemented in a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, the main memory 708 or a cache such as found in the north bridge and memory controller hub 702. A server may include one or more processors or CPUs. The depicted examples in FIG. 7 and above-described examples are not meant to imply architectural limitations. For example, portions of the computing system 700 also may be implemented in a tablet computer, laptop computer, or telephone device in addition to taking the form of a PDA.

Particular embodiments of the computing system 700 can take the form of an entirely hardware embodiment, an entirely software embodiment or an embodiment containing both hardware and software elements. In a particular embodiment, the disclosed methods are implemented in software, which includes but is not limited to firmware, resident software, microcode, etc.

Figure 8:
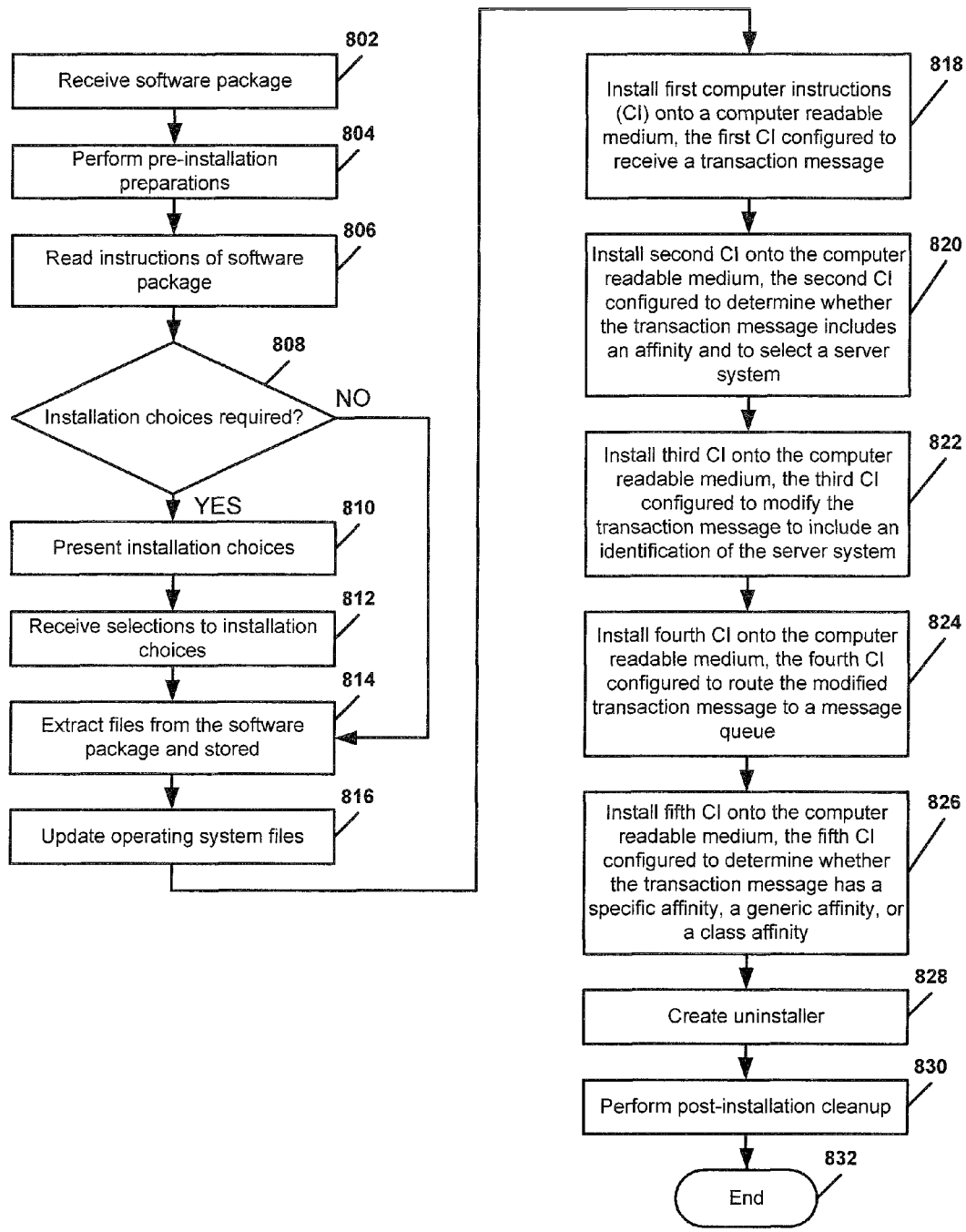
FIG. 8 is a flow diagram of a third illustrative embodiment of a method to route a transaction message.

FIG. 8 is a flow diagram of an illustrative embodiment of a method to create a computer implemented process. The method may be executed by a component of a server, such as the installer 780 in FIG. 7.

At 802, a software package may be received. For example, the installer 780 may receive the software package 782 from the software distributor 784 via the network 744. Continuing to 804, pre-installation preparations may be performed. For example, the installer 780 may determine whether there are sufficient resources, such as memory space and processor capacity, to install and run the software package 782. Moving to 806, the instructions of the software package may be read. The instructions of the software package may provide additional information associated with the installation.

Advancing to 808, a determination may be made whether any installation choices are required. For example, the installation choices may determine various configuration parameters and may determine which components of the software package are installed. When installation choices are not required, at 808, then the method proceeds to 814. When installation choices are required, at 808, then the installation choices are presented at 810. Proceeding to 812, selections to the installation choices are received. For example, the installer 780 may receive selections to the installation choices via system messages from the keyboard and mouse adapter 720.

Continuing to 814, files may be extracted from the software package and stored. For example, the installer 780 may extract files from the software package 782 and store the files at the disk drive 726 or the main memory 708. Moving to 816, operating system files may be updated. For example, the installer 780 may update a program registry of an operating system.

Proceeding to 818, first computer instructions (CI) may be installed onto a computer readable medium, the first CI configured to receive a transaction message. Advancing to 820, second CI may be installed onto the computer readable medium, the second CI configured to determine whether the transaction message includes an affinity and to select a server system. Continuing to 822, third CI may be installed onto the computer readable medium, the third CI configured to modify the transaction message to include an identification of the server system. Moving to 824, fourth CI may be installed onto the computer readable medium, the fourth CI configured to route the modified transaction message to a message queue. Proceeding to 826, fifth CI may be installed onto the computer readable medium, the fifth CI configured to determine whether the transaction message has a specific affinity, a generic affinity, or a class affinity to the server system.

Advancing to 828, an uninstaller may be created. The uninstaller may be used to remove a portion of or all of the computer instructions installed using the computer implemented process. Continuing to 830, post-installation cleanup may be performed. For example, the installer 780 may remove temporary files created during the installation process. The method ends at 832.

Further, embodiments of the present disclosure, such as the one or more embodiments in FIGS. 1-8, can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile disk (DVD).

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the data processing system either directly or through intervening I/O controllers.

Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

The invention claimed is:

1. A method, comprising:
   initializing a router based on one or more customer affinity definitions;
   receiving a transaction message at the router;
   determining whether the transaction message includes an affinity indicating an administrator-specified preference regarding processing of the transaction message and, when the transaction message includes the affinity, selecting a server system among a plurality of server systems to process the transaction message based on the affinity and based on a system affinity of the server system, wherein the system affinity specifies processing characteristics of the server system, and wherein the server system comprises a set of servers;

modifying the transaction message to include an identification of the server system;

routing the modified transaction message to a coupling facility;

receiving a notification message from the coupling facility, wherein the notification message requests a server associated with or including the router to send a bid to process the modified transaction message;

sending the bid to process the modified transaction message to the coupling facility;

receiving authorization to process the modified transaction message from the coupling facility based on a timestamp of the bid;

and processing the modified transaction message.

2. The method of claim 1, wherein selecting the server system comprises determining whether the transaction message has a specific affinity to the server system by determining whether a transaction affinity of the transaction message matches the system affinity associated with the server system.

3. The method of claim 2, further comprising determining whether the transaction message has a generic affinity to the server system by determining whether the transaction affinity of the transaction message matches a portion of the system affinity associated with the server system.

4. The method of claim 3, wherein the system affinity comprises a system identifier.

5. The method of claim 3, further comprising determining whether the transaction message has a class affinity by determining whether a transaction class of the transaction message matches a class attribute associated with the server system.

6. The method of claim 5, further comprising: identifying a set of target servers of the server system; determining whether the set of target servers includes at least one active server; and selecting the set of target servers when the set of target servers includes at least one active server.

7. The method of claim 1, wherein each server in the set of servers comprises a transaction management system.

8. The method of claim 1, further comprising initializing the router prior to receiving the transaction message, wherein a server associated with the router initializes the router.

9. The method of claim 8, wherein initializing the router comprises: retrieving the customer affinity definitions from a customer definitions library; and determining whether a runtime definitions library of the coupling facility includes the customer affinity definitions.

10. The method of claim 9, further comprising creating a routing table based on the customer affinity definitions wherein the routing table includes information associating at least one system affinity and at least one class affinity to each server in the set of servers.

11. The method of claim 9, further comprising:
determining whether an affinity definition of the customer affinity definitions includes an identity of the server associated with the router; and sending an affinity registration message to the coupling facility, wherein the affinity registration message identifies the server associated with the router with a server affinity based on the affinity definition.

12. The method of claim 1, wherein the timestamp indicates when the bid is sent by the router to the coupling facility.

13. The method of claim 1, wherein the timestamp indicates when the bid is received at the coupling facility from the router.

14. A method, comprising:
receiving a transaction message at a coupling facility;
comparing the transaction message to a runtime definitions library of the coupling facility, wherein the runtime definitions library includes runtime affinity definitions;
based on the comparison, determining whether the transaction message includes an affinity indicating a preference regarding processing of the transaction message;
selecting a server system from a plurality of server systems based on a selection algorithm and based on whether the transaction message includes the affinity;
sending a notification message to each of a plurality of servers of the selected server system, wherein the notification message requests each of the plurality of servers to send a bid to process the transaction message; receiving, at the coupling facility, at least one bid from at least one of the plurality of servers;
selecting a particular server from the plurality of servers based on a timestamp of a particular bid submitted by the particular server; and sending the transaction message to the particular server.

15. The method of claim 14, further comprising modifying the transaction message at a router before receiving the transaction message at the coupling facility.

16. The method of claim 14, wherein the timestamp indicates when the bid is received at the coupling facility from the particular server.

17. The method of claim 14, wherein the timestamp indicates when the bid is sent by the particular server to the coupling facility.

18. A system, comprising:
a plurality of server systems, wherein each server system comprises a set of servers;
a customer definitions library including one or more customer affinity definitions;
a coupling facility; and a router adapted to:
create a routing table based on the customer affinity definitions;
compare a transaction message to the routing table;
based on the comparison, determine an affinity of the transaction message to a particular server system of the plurality of server systems;
receive a modified transaction message, the modified transaction message based on the affinity to identify the particular server system;
and send the modified transaction message to the coupling facility,
wherein the coupling facility is adapted to:
receive the modified transaction message from the router;
send a notification message to the particular server system, wherein the notification message requests the particular server system to process the modified transaction message;
receive at least one bid from at least one server of the particular server system;
select a particular server from the set of servers based on a timestamp of a
particular bid submitted by the particular server;
and send the modified transaction message to the particular server.

19. The system of claim 18, wherein the particular server of the particular server system is adapted to:
receive the notification message from the coupling facility;
determine whether the particular server is capable of processing the modified transaction message; and send the particular bid to the coupling facility to process the modified transaction message after determining that the particular server is capable of processing the modified transaction message.

20. The system of claim 19, wherein the particular server is further adapted to: receive the modified transaction message from the coupling facility; and process the modified transaction message.

21. The system of claim 18, wherein the modified transaction message includes a transaction class and a transaction affinity.

22. The system of claim 21, wherein the transaction affinity indicates a preference regarding processing of the modified transaction message.

23. A server, comprising:
   a processor;
   and a router coupled to the processor, wherein the router is executable by the processor to:
   receive a transaction message at the router;
   determine whether the transaction message includes an affinity indicating an administrator-specified preference regarding processing of the transaction message and, when the transaction message includes the affinity, selecting a server system among a plurality of server systems to process the transaction message based on the affinity and based on a system affinity of the server system, wherein the system affinity specifies processing characteristics of the server system, and wherein the server system comprises a set of servers;
   modify the transaction message to include an identification of the server system;
   route the modified transaction message to a coupling facility;
   receive a notification message from the coupling facility, wherein the notification message requests the router to send a bid to process the modified transaction message;
   send the bid to process the modified transaction message to the coupling facility;
   receive the modified transaction message and authorization to process the modified transaction message from the coupling facility based on a timestamp of the bid;
   and process the modified transaction message.

24. The apparatus of claim 23, wherein the timestamp indicates when the bid is sent by the router to the coupling facility.

25. The apparatus of claim 23, wherein the timestamp indicates when the bid is received at the coupling facility from the router.

* * * * *